Patented Dec. 19, 1944

2,365,508

UNITED STATES PATENT OFFICE 2,365,508

CORK COMPOSITIONS

Paul R. Austin, Wilmington, Del., assignor to E. I. du Pont de Nemours & Company, Wilmington, Del., a corporation of Delaware No Drawing. Application September 9, 1940, Serial No. 356,116

2 Claims. (Cl. 260—9)

This invention relates to new and improved articles of manufacture comprising finely divided cork.

Because of its unique resilient properties, high frictional coefficient, and low coefficient of heat transfer, cork is widely used for closures, gaskets, friction clutches, spinning cots, expansion joints, acoustic tile, heat insulating tile, as an ingredient in linoleum, etc. With the exception of a few small articles such as floats and stoppers, which are made from pieces of natural cork, all other products are fabricated from ground cork bonded together to make the desired article. Cork sheets for insulating and acoustic tile are usually made by heating cork granules to a temperature sufficient to cause the natural cork resin to exude and cement the granules together. This treatment results in loss of part of the resilient character and also darkens the cork. The majority of cork users, therefore, depend on products made by using added binding agents to cement cork granules or dust. Binders commonly used are proteins such as tanned glue, gelatin, or casein, rubber and synthetic rubber materials, oxidized linseed oil modified resin, synthetic resins such as phenol-formaldehyde, alkyd resins, vinyl polymers, etc.

Most of these binders are thermosetting types which require long curing times to render them insoluble, and also have the disadvantage that scrap material is difficult to reuse. In addition the available thermoplastic binders have in general comparatively low softening points, so that cold flow is a serious problem. The linseed oil-resin binders usually used in the preparation of floor coverings of the linoleum type are very rapidly attacked by even mild alkali. On the other hand, those binders which are resistant to alkali are usually poor in resistance to oil and aromatic hydrocarbons.

This invention has as an object new and improved products which comprise bonded finely divided cork and which are free from many of the disadvantages mentioned above. A further object is the manufacture of cork articles of this kind in which the binder is fusible but yet has a melting point high enough that cold flow is negligible. A still further object is the preparation of articles of high tensile strength which comprise bonded particles of granular cork and in which the binder is resistant to both alkali and oil.

These objects are accomplished in the manner more fully pointed out hereinafter by means of compositions comprising finely divided cork and high molecular weight, fusible synthetic polyamides.

I have found that cork compositions of this kind can be prepared with a wide variety of properties ranging from resilient, cork-like products suitable for gaskets and closures to tough, abrasion-resistant, linoleum-like floor coverings.

In the manufacture of my improved products the polyamide binder may be combined or mixed with the cork particles by various methods such as coating the cork with a solution of the polymer, milling the cork with the polymer on a rubber mill, softening the polymer with the aid of heat, or with a small amount of solvent, or with both, and mixing the cork particles and polymer in a Banbury, Werner & Pfleiderer or other suitable mixing device.

The polyamides used in the practice of this invention are of the general types described in Patents 2,071,250, 2,071,253 and 2,130,948. They are high molecular weight polymers, which are fusible and which generally have an intrinsic viscosity of at least 0.4 as defined in the last mentioned patent. These polyamides are obtainable by polymerizing suitable amino acids or by reacting diamines with dibasic carboxylic acids, it being understood that the above mentioned reactants are replaceable with their equivalent amide-forming derivatives. Upon hydrolysis with mineral acids the polyamides produce bifunctional amide-forming compounds. For example, a polyamide prepared from a dibasic acid and a diamine yields upon hydrolysis with hydrochloric acid the dibasic acid and the diamine hydrochloride. The polyamides as defined herein comprise, in addition to polyamides obtained solely from polyamide-forming reactants, all fusible polymers which have recurring amide groups as an integral part of the polymer chain and which are obtainable by including other bifunctional polymer-forming reactants with the amide-forming reactants. In the polyamides of this invention the average number of carbon atoms separating the amide groups in the polymer chain is at least two. Examples of polyamides containing other groups besides amide groups are polyester-amides, e. g., those derived from diamines, dibasic acids and glycols, those derived from dibasic acids and amino alcohols, and those derived from an aminoacid, dibasic acid, and glycol. The mentioned polyester-amides are conveniently obtained by first preparing the low molecular weight polymer and then converting this by reaction with a diisocyanate or diisothiocyanate to a high molecular weight polymer.

The method of mixing and the quantity of polyamide in the cork compositions disclosed herein depend on the nature of the polyamide and the property desired in the final product. The amount of polyamide preferably ranges from 10 to 60% of the weight of the finished composition, although for some purposes these amounts may be as low as 5 or as high as 80%. In the preparation of cork-like products suitable for use as gaskets and closures, the cork is most conveniently coated with a solution of the polyamide since this allows a small quantity of binder to be used on a large quantity of cork, yet gives a uniform coating without crushing or grinding the cork particles as sometimes happens when the Banbury mixer or the rubber mill is used. To prepare products with a binder content of 30% to 60% or higher, the rubber mill or the Banbury mixer is the most convenient method of mixing. The cork-polymer mixtures may be processed further by pressing, baking, calendering, extruding, etc., so as to get the product in the shape or form desired. Thus, pressing and baking may be used to prepare blocks of cork composition which can be sheeted into material suitable for gaskets and closures. Discs for closures may likewise be prepared by extruding a cylindrical "cane" of cork composition and slicing off discs. Calendering operations are most useful for sheeting those compositions containing relatively large amounts of binder. Such compositions are useful for floor coverings. These compositions may in addition contain various modifying agents such as plasticizers, synthetic resins, and softening agents such as glycerol.

The following examples, in which all parts are by weight, illustrate the invention in greater detail.

Example I

An interpolyamide is prepared by heating 6000 parts of hexamethylenediammonium adipate, 4000 parts of epsilon-aminocapronitrile, 4000 parts of water, and 20 parts of acetic acid (stabilizer) for one hour at 195–200° C. under the generated pressure (250–300 lbs./sq. in.). The temperature is then raised over a half-hour period to 235–240° C., water being bled off at such a rate as to maintain a pressure of 250 lbs./sq. in. Heating is continued under these conditions for three hours and the water then bled off to atmospheric pressure (one-half hour) and heating continued for 3.5–4 hours under reduced pressure (100 mm.). The polymer has a melt viscosity of 1419 poises at 250° C. and melts at 170–175° C.

Eight parts of the above prepared polymer, 2 parts of a non-thermosetting p-hydroxybiphenyl-formaldehyde resin, 5 parts of glycerol, and 85 parts of cork granules, which pass through a 20 mesh screen but are retained on 30 mesh, are blended into a cork composition suitable for gaskets and closures as follows: The cork granules are treated with the glycerol, which has been diluted with an equal volume of water, and then allowed to dry before the binder is applied. The binder solution is prepared by dissolving the polyamide in 15 times its weight of warm 80% aqueous ethanol. The phenolic resin is dissolved in 15 times its weight of benzene and the solution added to the hot alcohol solution of the polyamide. The combined solution is poured over the glycerol treated cork and thoroughly mixed so that the granules are uniformly coated with binder. The coated cork is allowed to dry until the retained solvent represents only 10% of the total weight. The moist granules are compressed in a mold to give a cake having a density of 0.25 g./cc., then baked at 130° C. for 1.5 hours. As the size of the pressed cake is increased, the time required to develop a good bond must be increased so that for a two-inch thick block 6 hours at 130° C. is required. The block of bonded cork can be sheeted in the customary manner.

The sheet cork prepared in accordance with the above example has extremely high tensile strength and remarkable resistance to oil and water. For example, the composition will withstand three hours in boiling water or two hours in a S. A. E. #20 motor oil without any signs of disintegration. The tensile strength of the product is 313 lbs./sq. in., as compared to 192 lbs./sq. in. for a standard protein bonded composition made from the same size of cork granules. In the standard compression and recovery test for cork products (see Faubel, "Cork and American Cork Industry") the polyamide bonded material shows a compression of 7.3% and a recovery of 99.5%.

Example II

A mixture containing 195.5 parts of ethylene glycol, 109.9 parts of ethanolamine, 723.1 parts of adipic acid, and 100 parts of water is heated for two hours at 170° C. at atmospheric pressure, followed by six hours at 200° C. under 2 mm. pressure. The product at this stage is a low molecular weight linear polyesteramide containing about 82% ester groups. It is a soft fluorescent wax having an acid number of 10.4. Seven hundred parts of this wax is mixed with 35 parts of hexamethylene diisocyanate and allowed to react at 200° C. in a W. & P. mixer for thirty minutes. While still hot, the tough rubbery, high molecular weight polymer is removed from the mixer and cut into small pieces. One part of this polymer is milled with one part of cork particles (finer than 30 mesh) between heated rolls (60–90° C.) of a rubber mill to give a composition which when molded at 100° C. and 1500 lbs./sq. in. gives a soft, resilient product.

Example III

Sixty parts of waxy polymer (acid No. 10.4) identical with that described in Example II is heated to 150°–170° C. in a W. & P. mixer. To the polymer is added 40 parts of fine cork particles (less than 30 mesh) moistened with chloroform. When the cork is thoroughly mixed into the polymer there is added slowly with mixing 3 parts of hexamethylene diisocyanate. The stiff product resulting after the diisocyanate is allowed to react for ten minutes is removed from the mixer and rolled into sheet form on a rubber mill. These sheets are then hot pressed at 150° C. and at a pressure of 6000 lbs./sq. in. to give a smooth, tough, resilient product which is highly resistant to swelling in hydrocarbons, both aliphatic and aromatic.

Example IV

By means of a heated Banbury mixer 30 parts of cork flour, 20 parts of lithopone, and 20 parts of red iron oxide are milled into 30 parts of polymer prepared as described in Example II. As soon as a homogeneous mass is obtained, the mix is removed and pressed into ⅛" thick sheets at a temperature of 100° C. under a pressure of 1000 lbs./sq. in. The product obtained is tough, pliable, and resilient.

Example V

A mixture of 514 parts of hexamethylenediammonium adipate, (the salt of hexamethylene diamine and adipic acid) 2044 parts of adipic acid, 912 parts of ethylene glycol, and 400 parts of water is heated in a stream of nitrogen for 6.5 hours at 125–200° C. and for 10.5 hours at 200° C. at atmospheric pressure. On cooling, a light-colored wax with an acid number of 26.8 is obtained. This low molecular weight polyester-amide containing about 87% ester groups is melted, heated to 160° C. in a closed stainless steel Read mixer and 8% of hexamethylene diisocyanate added in small portions during the course of 20–30 minutes. The temperature is then raised to 170° C. and mixing continued until the reaction is complete (20 to 40 min.).

One hundred parts of the above polymer is dissolved in a mixture of 200 parts of chloroform and 100 parts of methanol. To this solution there is added 57 parts of cork flour, 43 parts of wood flour, 35 parts of lithopone, and 50 parts of brown iron oxide. The composition is mixed thoroughly and passed through a screw feed grinder. The moist granules from the grinder are dried to remove the solvent, then pressed into 25 mil sheets at 150° C. and 1000 lbs./sq. in. pressure.

The sheets prepared in this way have a smooth attractive surface and are well suited for floor coverings of the linoleum type. The surface also has desirable non-slip characteristics. Abrasion tests made on a standard model J Taber abraser (Taber Instrument Company, North Tonawanda, New York) using SA–17 abrading wheels show this material to be superior to standard commercial floor coverings of the linoleum type. For example, the product prepared above shows an average wear of 1.5 mils in 2000 cycles on the Taber abraser while a standard make of battleship linoleum shows a wear of 2.8 mils. Another widely used type of hard surface floor covering shows 2.4 mils wear in the same number of cycles. The polyamide composition is only slightly roughened on the surface after two hours' immersion in 5% sodium hydroxide solution at room temperature, while standard linoleum compositions are severely attacked in less than five minutes and completely disintegrated in less than two hours in the same solution.

Example VI

Sixty parts of a linear interpolyamide (melting point 135–140° C.; intrinsic viscosity 1.05) prepared by condensation polymerization of equimolecular parts of hexamethylenediammonium adipate and decamethylenediammonium sebacate is dissolved in 590 parts of 90% formic acid. To this solution is added 150 parts of 10 mesh (retained on 20) shredded cork. This product is then pressed in a hydraulic press for ten minutes at 150–160° C. A cork composition suitable for gaskets and closures is obtained.

The polymers mentioned in the foregoing examples may be replaced by a wide variety of other polyamides described in the previously mentioned patents. The most valuable polyamides for the present purpose are the interpolyamides obtained from a mixture of different polyamide-forming reactants, and the polyester-amides. The first mentioned of these polymers, particularly when obtained from a diamine, a dibasic acid and epsilon-amino-caproic acid, are valuable because of their high melting points, toughness and resistance to alkali and hydrocarbons. The polyester-amides, especially when prepared from ethylene glycol, hexamethylene diamine and adipic acid, are valuable because of the toughness and resiliency imparted to the cork composition. These properties being particularly useful in floor coverings when properly compounded with cork and suitable pigments.

As previously mentioned the present composition may include modifying agents such as plasticizers, cork softening agents, waxes, resins, pigments, antioxidants, fillers, extenders, antitack agents, and fungicides. The plasticizers, which include substances such as toluenesulfonamides and other sulfonamides, phenols such as resorcinol, and various esters and ethers serve to increase the flexibilty and pliability of those compositions containing relatively large amounts of polyamide binders. In order to increase the flexibility of those compositions which contain a large amount of cork, other materials such as glycerol, ethylene glycol, propylene glycol, mannitol, and sorbitol are added to act as softening agents for the cork. Waxes such as paraffin, carnauba, beeswax, Asiatic, montan, and hydrogenated castor oil may be added in small amounts to improve the water resistance of the compositions and also to act as antitack agents in calendering operations. Other suitable antitack agents are castor oil, oleic acid, and stearic acid. For some purposes the present cork compositions are desirably modified with natural resins and with synthetic resins of the non-thermosetting type. Suitable natural resins and their derivatives include rosin, hydrogenated rosin, ester gum, shellac, gum kauri, copal, etc. Examples of useful synthetic resins are those of the phenol-formaldehyde type obtainable by reacting formaldehyde with p-hydroxydiphenyl, p-tertiary-butylphenol, p-tertiary-amylphenol, or o-cyclohexylphenol. Fillers and extenders useful in cork compositions include wood flour, chalk, clay, whiting, vermiculite, mica, leather dust, asbestos, silica, etc. Pigments suitable for incorporation in the polyamide-cork compositions include zinc oxide, carbon black, lakes, azo pigments, Prussian blue, chrome green, titanium oxide, iron oxide, Lithol red, lithopone, zinc sulfide, antimony sulfide, iron blue, and the phthalocyanines. Mixtures of pigments may also be used.

Cork products prepared from granulated cork bonded with polyamides have extremely varied uses depending on the ratio of cork to binder and on the presence of other materials such as fillers and pigments. Granules bonded with up to 20% polyamide have essentially cork-like properties and are useful for gaskets, closures, shoe insoles, and counters, spinning cots, heat insulating and acoustic tile, polishing wheels, stereotype blankets, vibration dampeners, knife handles, fishing rod handles, etc. Polyamide binders give products with good oil and water resistance and in addition higher tensile strength than the usual commercial binders.

As the percentage of the polyamide binder is increased to 50 to 60%, the properties of the composition approach those of the polyamide. The cork in all cases, although superficially only a filler, contributes valuable resilient properties. These materials of higher binder content are useful for special types of gaskets, valve cups, grease retainers, spinning cots, vibration dampeners, etc., where great resistance to oils and other hydrocarbons is necessary. Mixtures of polyamides, cork granules, and fillers together with suitable pigments are useful for making hard surface floor coverings similar to linoleum, especially since the polyamide compositions possess unusual alkali and abrasion resistance. In addition to these advantages, the polyamide compositions are cheaper to process since they require no expensive curing or stoving operations.

The term "fusible" as applied to the polymers in the foregoing description and in the appended claims signifies that the polymers are not of the thermosetting type, such as phenol-formaldehyde and urea-formaldehyde condensation products, but retain their fusibility on prolonged heating at their melting point or at elevated temperatures, e. g. 200 to 225° C.

With further reference to the appended claims it should be understood that mention of such polyamide-forming reactants as diamines, dicarboxylic acids, and amino acids include also amide-forming derivatives of these reactants since these derivatives are equivalents of the mentioned reactants in the polyamide-forming reaction.

As many apparently widely different embodiments of this invention may be made without departing from the spirit and scope thereof, it is to be understood that I do not limit myself to the specific embodiments thereof except as defined in the appended claims.

I claim:

1. A composition of matter comprising finely divided cork bonded with thermoplastic bonding material in amount of from 5% to 80% by weight of said composition, said bonding material being a fusible synthetic linear polymer of intrinsic viscosity above 0.4 which consists essentially of polyesteramide composed of ester and amide groups in substantial amount and in preponderant amount of ester groups, and which is the reaction product of a diisocyanate with the low molecular weight polyesteramide obtained from reacting material selected from the group consisting of (a) mixtures of monoaminomonocarboxylic acid, dibasic carboxylic acid, and glycol, (b) mixtures of diamines, dibasic carboxylic acid and glycol, and (c) mixtures of dibasic carboxylic acid and monoaminomonohydric alcohol.

2. A composition of matter comprising finely divided cork bonded with thermoplastic bonding material in amount of from 5% to 80% by weight of said composition, said bonding material being a fusible synthetic linear polymer of intrinsic viscosity above 0.4 which consists essentially of polyesteramide composed of ester and amide groups in substantial amount and in preponderant amount of ester groups, and which is the reaction product of a diisocyanate with the low molecular weight polyesteramide obtained from hexamethylene diamine, adipic acid and a glycol.

PAUL R. AUSTIN.